(No Model.)
A. C. HAYDEN & C. J. POWELL.
WHEEL PLOW.
No. 355,607. Patented Jan. 4, 1887.
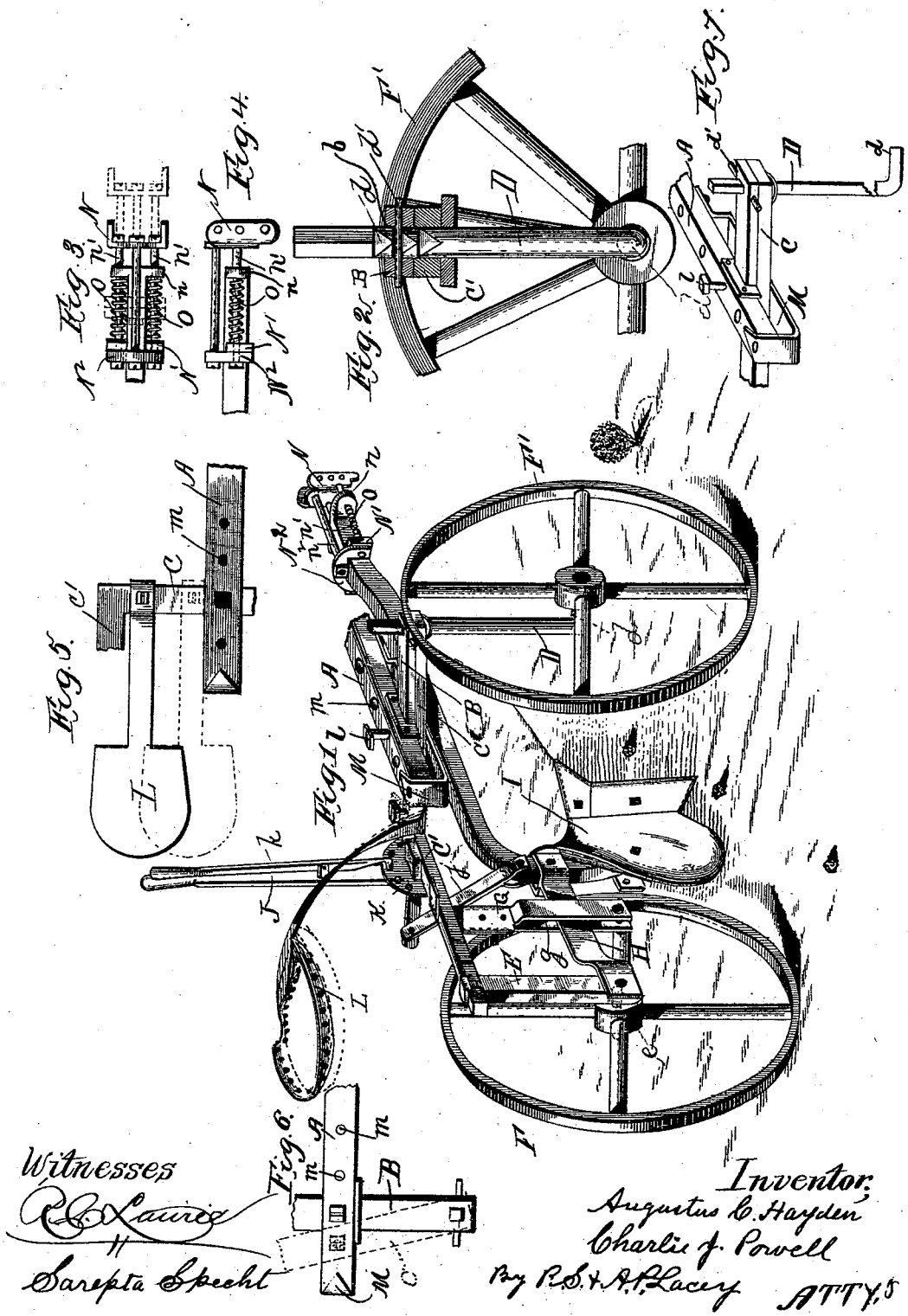
Witnesses
C. E. Laurie
Sarepta Specht
Inventor:
Augustus C. Hayden
Charlie J. Powell
By R. S. & A. P. Lacey
ATTY.S

UNITED STATES PATENT OFFICE.

AUGUSTUS C. HAYDEN AND CHARLIE J. POWELL, OF GARDNER, KANSAS; SAID POWELL ASSIGNOR TO SAID HAYDEN.

WHEEL-PLOW.

SPECIFICATION forming part of Letters Patent No. 355,607, dated January 4, 1887.

Application filed September 29, 1886. Serial No. 214,819. (No model.)

*To all whom it may concern:*

Be it known that we, AUGUSTUS C. HAYDEN and CHARLIE J. POWELL, citizens of the United States, residing at Gardner, in the county of Johnson and State of Kansas, have invented certain new and useful Improvements in Wheel-Plows; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to wheel-plows; and it consists in the novel features more fully hereinafter set forth, claimed, and shown in the annexed drawings, in which—

Figure 1 is a perspective view of a plow embodying our improvements. Fig. 2 is a section of the same on the line X X. Figs. 3 and 4 are detail views of the clevis. Fig. 5 is a detail view showing the adjusted position of the seat. Fig. 6 is a detail plan view of a portion of the pole, the arm projecting laterally therefrom, and the plow-frame, showing the adjustment of the latter by dotted lines. Fig. 7 is a perspective detail view of the parts shown in Fig. 6.

The pole or tongue A has an arm, B, projecting laterally therefrom, near its rear end, which arm has a vertical aperture, $b$, formed in its outer end.

The plow-frame is composed of a bar, C, extended at right angles to the pole, and projecting on each side thereof, and having one end pivotally connected with the arm B by the vertical standard D, and the bar C', which latter extends rearwardly from the end of the bar C, opposite to that which is pivotally connected with arm B. The standard E, depending from the rear of the bar C', has a spindle, $e$, upon which the wheel F is mounted. A guide, G, secured to the bar C', directly in front of the standard E, projects downwardly, and has its lower end provided with a slot, $g$, which extends in a direction parallel with the draft of the plow. The link H, passed through the slot $g$ in the guide, has its rear end pivotally connected with the standard E, and has the plow I pivotally connected with its front end. The hand-lever J, supported on the plow-frame, is connected with the plow by the link $j$, and is held in an adjusted position by the segment K and hand-latch $k$.

The seat L is supported upon the bar C of the plow-frame, and is adjustable thereon nearer to or farther from the pole, in such manner that the weight of the driver may be brought to bear more or less upon the plow to hold the same in the ground.

The vertical standard D, which forms the pivotal connection between the arm B and the bar C of the plow-frame, has a vertical adjustment relative thereto. Its upper end, which is preferably angular in cross-section, is provided with a series of notches, $d$, one of which is engaged by the pin $d'$, passing transversely through the arm, and holds it in an adjusted position. The lower end of said standard is provided with a spindle, $d^2$, upon which the wheel F' is mounted. The spindle may be separate from and attached to the standard, or it may form an integral part thereof, in which case the lower portion of the standard will be bent at right angles, as shown.

A keeper, M, secured to the under side of the pole, holds the bar C of the plow-frame close to the pole and limits its movements. The plow-frame may be held at any inclination or adjustment relative to the pole by any suitable means, preferably by a pin, $l$, passing through one of a series of openings, $m$, in the end of the pole, and through a corresponding opening in the bar C. Said pin may extend entirely through the bar C, and pass through one of a series of corresponding openings in the keeper.

In practice the wheel F is arranged in the rear of the plow, and in a plane passing through the front edge of the share and mold-board of the plow. By this construction the wheel performs the function of the landside. The opposite wheel, F', is arranged at such distance from the wheel F that it runs in the furrow previously made by the plow, and also serves to assist the wheel F and take up the lateral draft. The wheels are so disposed relative to the plow that they will at all times run in the furrows, or in the spaces between the furrows, so that they are practically in the same horizontal plane at all times.

The end of the plow-beam is provided with lateral extensions $n$, through which rods $n'$ are passed. The front ends of the rods are connected by a clevis, N, and the rear ends are united by a yoke, N', which embraces the beam on three sides. A corresponding yoke, $N^2$, set astraddle of the beam, is connected with the clevis by a rod, $n^2$.

Springs O, surrounding the rods $n'$, and confined between the extensions $n$ and the yoke N', relieve the jar on the horses when plowing in stony or root land, and at the same time prevent injury to the team and plow.

Having thus described our invention, what we claim, and desire to secure by Letters Patent, is—

1. The combination, with the pole and the frame connected therewith, and free to have a horizontal adjustment substantially in the arc of a circle, of the pin locking the frame in an adjusted position, and the plow supported by said frame and having a vertical adjustment relative thereto, substantially as and for the purpose set forth.

2. The combination, with the pole having an arm projecting laterally therefrom and a wheel connected therewith, of a bar or frame horizontally adjustable, pivoted to the outer end of the arm and extending across the beam on each side thereof, and having another supporting-wheel connected therewith, the pin locking said bar in an adjusted position, and the plow supported by said frame, substantially as and for the purpose set forth.

3. The combination, with the pole having an arm projecting laterally therefrom and the plow-supporting bar or frame, of the standard pivotally connecting said plow-supporting bar with the arm and having its lower end provided with a spindle, and the wheel mounted thereon, substantially as and for the purpose described.

4. The combination, with a pole having an arm projecting laterally therefrom, and the plow-supporting bar or frame extended on each side of the beam, of the keeper secured to the pole and holding said bar in place and limiting its movement, and the wheel-standard pivotally connecting the bar with the outer end of the arm, substantially as and for the purpose set forth.

5. The combination, with the plow-frame having a depending standard and slotted guide, the latter located in front of the standard, and the horizontal bar passed through the slot in the guide and having its rear end pivoted to the lower end of the standard, of the plow pivoted to the front end of said bar, the hand-lever supported on the frame, the link connecting the plow and lever, and a pawl and segment for holding the lever in an adjusted position, substantially as set forth.

In testimony whereof we affix our signatures in presence of two witnesses.

AUGUSTUS C. HAYDEN.
CHARLIE J. POWELL.

Witnesses:
D. N. WHITAKER,
ABEL SMITH.